United States Patent
Sarnad et al.

(10) Patent No.: US 10,922,199 B2
(45) Date of Patent: Feb. 16, 2021

(54) ROLE MANAGEMENT OF COMPUTE NODES IN DISTRIBUTED CLUSTERS

(71) Applicant: VMWARE, INC., Palo Alto, CA (US)

(72) Inventors: Chetan Sarnad, Bangalore (IN); Shankar Kommineni, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 213 days.

(21) Appl. No.: 16/027,291

(22) Filed: Jul. 4, 2018

(65) Prior Publication Data

US 2020/0012577 A1 Jan. 9, 2020

(51) Int. Cl.
*G06F 11/00* (2006.01)
*G06F 11/20* (2006.01)
*H04L 29/08* (2006.01)
*H04L 29/14* (2006.01)

(52) U.S. Cl.
CPC ...... *G06F 11/2023* (2013.01); *H04L 67/1093* (2013.01); *H04L 67/1095* (2013.01); *H04L 69/40* (2013.01)

(58) Field of Classification Search
CPC .. G06F 11/2023; G06F 16/27; G06F 11/2028; G06F 11/1458; G06F 11/202; G06F 11/2064; G06F 11/2092; H04L 69/40
See application file for complete search history.

(56) References Cited

U.S. PATENT DOCUMENTS

| | | | | |
|---|---|---|---|---|
| 6,363,416 | B1* | 3/2002 | Naeimi | H04L 12/66 709/209 |
| 7,958,385 | B1* | 6/2011 | Frangioso | G06F 11/2025 709/223 |
| 8,498,967 | B1* | 7/2013 | Chatterjee | G06F 11/2069 707/674 |
| 8,688,642 | B2* | 4/2014 | Manmohan | G06F 11/2023 707/640 |
| 9,537,739 | B1* | 1/2017 | Wang | H04L 43/0817 |
| 10,289,496 | B1* | 5/2019 | Chopra | G06F 11/1464 |
| 10,503,612 | B1* | 12/2019 | Wang | G06F 9/45558 |
| 2003/0149735 | A1* | 8/2003 | Stark | H04L 29/06 709/208 |
| 2006/0075061 | A1* | 4/2006 | Garcia | G06F 9/526 709/213 |
| 2012/0113835 | A1* | 5/2012 | Alon | H04L 43/0817 370/252 |
| 2012/0173589 | A1* | 7/2012 | Kwon | G06F 16/2282 707/803 |

(Continued)

*Primary Examiner* — Loan L. T. Truong (57) ABSTRACT

In one example, a distributed cluster may include compute nodes having a master node and a replica node, an in-memory data grid formed from memory associated with the compute nodes, a first high availability agent running on the replica node, and a second high availability agent running on the master node. The first high availability agent may determine a failure of the master node by accessing data in the in-memory data grid and designate a role of the replica node as a new master node to perform cluster management tasks of the master node. The second high availability agent may determine that the new master node is available in the distributed cluster by accessing the data in the in-memory data grid when the master node is restored after the failure and demote a role of the master node to a new replica node.

20 Claims, 5 Drawing Sheets

(56) References Cited

U.S. PATENT DOCUMENTS

| | | | |
|---|---|---|---|
| 2013/0036092 A1* | 2/2013 | Lafont | G06F 16/178 |
| | | | 707/634 |
| 2013/0290249 A1* | 10/2013 | Merriman | G06F 16/273 |
| | | | 707/610 |
| 2014/0047263 A1* | 2/2014 | Coatney | G06F 11/2023 |
| | | | 714/4.11 |
| 2014/0258771 A1* | 9/2014 | Xie | G06F 11/2033 |
| | | | 714/4.11 |
| 2015/0378761 A1* | 12/2015 | Sevigny | G06F 11/1438 |
| | | | 718/1 |
| 2016/0077937 A1* | 3/2016 | Inforzato | G06F 11/2028 |
| | | | 714/4.11 |
| 2016/0085462 A1* | 3/2016 | Buzzard | G06F 3/0617 |
| | | | 711/162 |
| 2016/0371110 A1* | 12/2016 | Radhakrishnan | G06F 11/0757 |
| 2017/0075946 A1* | 3/2017 | Bossa | G06F 16/2471 |
| 2017/0103003 A1* | 4/2017 | Jin | G06F 21/53 |
| 2017/0208113 A1* | 7/2017 | Douros | G06F 11/1438 |
| 2017/0339005 A1* | 11/2017 | Yuan | H04L 41/0677 |
| 2017/0364423 A1* | 12/2017 | Peng | G06F 11/2025 |
| 2017/0373926 A1* | 12/2017 | Shang | H04L 41/0654 |
| 2018/0048587 A1* | 2/2018 | Bai | H04L 67/10 |
| 2018/0096068 A1* | 4/2018 | Venkataramanappa | |
| | | | G06F 11/1464 |
| 2018/0115456 A1* | 4/2018 | Bendre | H04L 43/10 |
| 2018/0139065 A1* | 5/2018 | Chan | H04L 12/10 |
| 2018/0227363 A1* | 8/2018 | Xiang | H04L 67/1095 |
| 2018/0270145 A1* | 9/2018 | Chen | H04L 67/141 |
| 2018/0337987 A1* | 11/2018 | Jain | G06F 11/2058 |
| 2019/0052708 A1* | 2/2019 | Xiang | G06F 13/102 |
| 2019/0235978 A1* | 8/2019 | Wu | G06F 11/2033 |
| 2019/0324666 A1* | 10/2019 | Kusters | G06F 3/065 |
| 2019/0354441 A1* | 11/2019 | Ramachandran | G06F 11/1451 |
| 2020/0042619 A1* | 2/2020 | Venkataramani | G06F 16/27 |
| 2020/0097355 A1* | 3/2020 | Zeng | G06F 11/076 |

* cited by examiner

ROLE MANAGEMENT OF COMPUTE NODES IN DISTRIBUTED CLUSTERS

TECHNICAL FIELD

The present disclosure relates to distributed clusters, and more particularly to methods, techniques, and systems for role management of compute nodes in distributed clusters.

BACKGROUND

Enterprise applications may adopt scale-out architecture to meet the growing demands of market needs in terms of performance and capacity. As part of the scale-out architecture, services may be built to form a service cluster (e.g., a distributed cluster) running on different compute nodes (e.g., physical computers, containers, virtual machines, and the like). In the distributed cluster, one of the compute nodes may be assigned a role of master to manage the distributed cluster by coordinating activities of the compute nodes. Further, another compute node may be assigned a role of replica for high availability (e.g., to operate the distributed cluster continuously without a failure). For example, when the service owning the master role is down due to a network failure or service unresponsiveness, the replica node may become a new master node and may provide the services of the master node. When a role fail-over happens as a part of the distributed cluster, there may exist a dual role scenario (e.g., dual master nodes) due to network instability and application performance degradation.

The drawings described herein are for illustration purposes only and are not intended to limit the scope of the present subject matter in any way.

DETAILED DESCRIPTION

Embodiments described herein may provide an enhanced method, technique, and system for a role management of compute nodes in a distributed cluster. The term "distributed cluster" may refer to a group of compute nodes (e.g., physical machines, containers, virtual machines, and the like) that are virtually or geographically separated and that work together to provide a service or an application to clients. The distributed cluster may include shared resources and a shared management interface. Further, the compute nodes may be assigned roles such as a master, a replica, and the like for managing operation and performance of the distributed cluster.

A master node may be an initial node to manage other compute nodes (e.g., data nodes) in the distributed cluster. For example, the master node may perform cluster management tasks such as, but are not limited to, tracking the compute nodes, tracking a number of indices in the distributed cluster, tracking the number of shards belonging to each index, and maintaining routing information for the compute nodes. Further, the master node may update the distributed cluster state after state changes, such as creating an index and adding or removing compute nodes in the distributed cluster. Also, the master node may replicate changes to the distributed cluster state across the compute nodes. Furthermore, the master node may monitor health of compute nodes (e.g., availability of the compute nodes in the distributed cluster). Thus, the master node may control the distributed cluster.

To enable high availability, the distributed cluster may include a compute node, which may be a replica of the master node. The replica node may be a copy of the master node and may synchronize with the master node in case the master node fails. For example, when the master node fails, the replica node can take over the functions of the master node. Further, failover to the replica node may be automatic. However, when the master node is restored from the failure, the distributed cluster may include dual master nodes (e.g., one being the master node and the other being the replica node acting as the master node) due to race condition or network instability, and application performance degradation.

Some methods for resolving the dual-master scenario may include restarting the entire application service cluster (i.e., the distributed cluster), which may incur a significant down time of the distributed cluster or a delay in performing the management tasks. Examples described herein may automatically correct dual master node scenarios without the services being restarted in the distributed cluster.

Examples described herein may store data associated with compute nodes in an in-memory data grid. The compute nodes may include a master node, a replica node, and data nodes in a distributed cluster. A first high availability agent running on the replica node may determine a failure of the master node by accessing the data in the in-memory data grid and designate a role of the replica node as a new master node to perform cluster management tasks of the master node. When the master node is restored after the failure, a second high availability agent running on the master node may determine that the new master node is available in the distributed cluster by accessing the data in the in-memory data grid and demote a role of the master node to a new replica node. Thus, the dual master nodes may not exist in the distributed cluster.

System Overview and Examples of Operation

Figure 1:
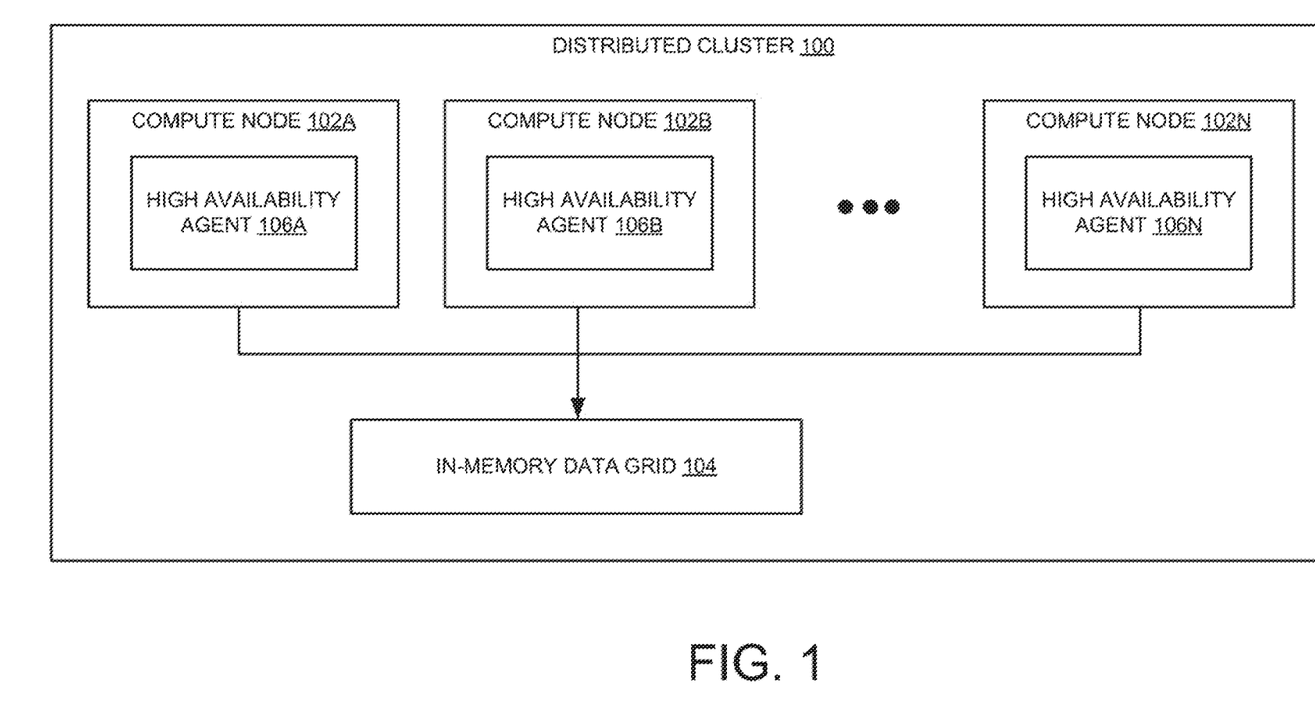
FIG. 1 is a block diagram of an example distributed cluster illustrating a role management of compute nodes.

FIG. 1 is a block diagram of example distributed cluster 100 illustrating a role management of compute nodes (e.g., 102A-N). As shown in FIG. 1, distributed cluster 100 may include multiple compute nodes 102A-N and an in-memory data grid 104 that is in communication with compute nodes 102A-N. Each compute node (e.g., 102A-N) may refer to a computing device or computer program (i.e., executing on a computing device). Example compute nodes 102A-N may include, but are not limited to, physical host computing devices, virtual machines, containers, or the like. The virtual machines may operate with their own guest operating systems on a physical computing device using resources of the physical computing device virtualized by virtualization software (e.g., a hypervisor, a virtual machine monitor, and the like). A container is a data computer node that runs on top of a host operating system (OS) without the need for a hypervisor or separate OS.

In one example, compute nodes 102A-N may include processing resources/processors and memories. Example processor can be any custom made or commercially available processor, a central processing unit (CPU), an auxiliary processor among several processors associated with compute nodes 102A-N, a semiconductor-based microprocessor (in the form of a microchip or chip set, for example), a macroprocessor, or generally any device for executing computer-readable program code. Example memory may be a computer-readable storage medium. In some examples, memory can have a distributed architecture, where various components are situated remote from one another, but can be accessed by compute nodes 102A-N. Processors may be configured to execute software stored within associated one of memories, to communicate data to and from the memory, and to generally control operations of compute nodes 102A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

In some examples, one of the compute nodes (e.g., 102A) may be assigned a role of a master node to perform cluster management tasks. Another compute node (e.g., 102B) may be assigned a role of a replica node, which may act as a replica of master node 102A for enabling high availability during a failure of master node 102A. Further, other compute nodes (e.g., 102C-102N) may be data nodes to perform data collection and analysis. In one example, each of compute nodes 102A-N may include a high availability agent (e.g., 106A-N), For example, compute nodes 102A and 102B may run high availability agents 106A and 106B, respectively, to assign roles to compute nodes 102A and 102B in distributed cluster 100 by accessing data in in-memory data grid 104.

In-memory data grid 104 may be formed from memory associated with compute nodes 102A-N. In-memory data grid 104 may be a data store (e.g., storing data in associated shared replication region of in-memory data grid 104) spanning plurality of compute nodes 102A-N that are joined in distributed cluster 100. Further, in-memory data grid 104 may distribute or replicate the stored data across compute nodes 102A-N. Examples of in-memory data grid may include Pivotal® Gemfire®, Oracle® Coherence®, JBoss® Infinispan®, Hadoop™, Hazelcast™, and the like.

During operation, high availability agent 106B running on replica node 102B may determine a failure of master node 102A by accessing data in in-memory data grid 104. Further, the role of replica node 102B may be designated as a new master node to perform cluster management tasks of master node 102A upon determining the failure. In one example, a failover operation may be initiated to failover replica node 102B to the new master node upon determining the failure of master node 102A. The failover operation may be defined as a process of switching a role of replica node 102B to the new master node to perform cluster management tasks of master node 102A. An example operation of replica node 102B is explained in detail in FIG. 2.

In one example, when master node 102A is restored after the failure, a high availability agent 106A running on master node 102A may determine that the new master node is available in distributed cluster 100 by accessing the data in in-memory data grid 104. Further, high availability agent 106A may demote the role of master node 102A to a new replica node upon determining the new master node in distributed cluster 100. An example operation of master node 102A is explained in detail in FIG. 3.

Thus, high availability agents (106A and 106B) running on master node 102A and replica node 102B may automatically resolve the dual role scenario in distributed cluster 100. In other words, high availability agents (106A and 106B) running on master node 102A and replica node 102B may prevent dual roles in distributed cluster 100 corresponding to the roles that are meant to be unique per cluster.

Further, the functionalities described herein, in relation to instructions to implement functions of high availability agents 106A-N and any additional instructions described herein in relation to the storage medium, may be implemented as engines or modules including any combination of hardware and programming to implement the functionalities of the modules or engines described herein.

Figure 2:
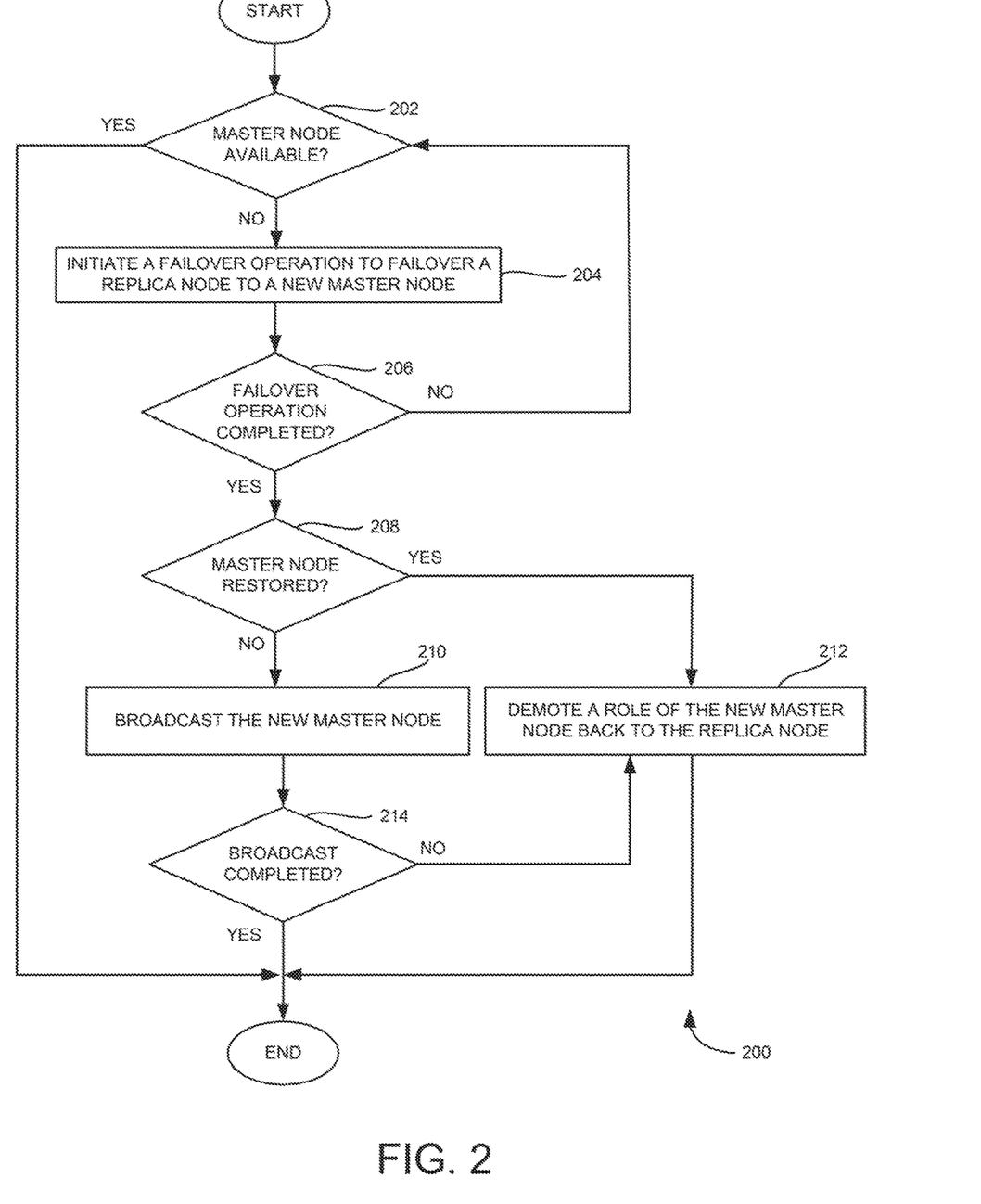
FIG. 2 is an example flow diagram illustrating a role management of a replica node in a distributed cluster.

FIG. 2 is example flow diagram 200 illustrating a role management of a replica node (e.g., replica node 102B of FIG. 1) in a distributed cluster. In one example, steps 202 to 214 may be executed by a first high availability agent running on the replica node. At 202, a check may be made to determine whether a master node in the distributed cluster is available. In one example, the first high availability agent running on the replica node may continuously check for the failure of the master node in the distributed cluster by accessing data in an in-memory data grid. The in-memory data grid may include distributed persistence store mechanism to replicate the data across the compute nodes. For example, when an entry or data gets written to a shared replication region of the in-memory data grid, the data may be replicated among the compute nodes in the distributed cluster. With the data in the in-memory data grid, the unavailability of the master node in the distributed cluster may be detected.

At 204, a failover operation may be initiated to failover the replica node to a new master node upon determining the failure or unavailability of the master node. The failover operation may be referred to as a process of switching a role of the replica node to perform tasks of the master node when the master node fails in the distributed cluster. At 206, a check may be made to determine whether the failover operation is completed. In one example, during execution of the failover operation (i.e., when the failover operation is yet to be completed), a check may be made to determine whether the master node is restored or available by accessing the data in the in-memory data grid. Further, the execution of the failover operation may be terminated upon determining the restoration of the master node.

At 208, upon completion of the failover operation, a check may be made to determine whether the master node is restored by accessing the data in the in-memory data grid. When the master node is not restored, a role of the replica node may be designated as the new master node. At 210, the new master node may be broadcasted to the compute nodes in the distributed cluster. When the master node is restored prior to broadcasting the new master node, the role of the new master node may be demoted back to the replica node, at 212. Further, a check may be made to determine whether broadcasting of the new master node is unsuccessful, at 214. When the broadcasting is unsuccessful, the role of the new master node may be demoted back to the replica node, at 212.

Figure 3:
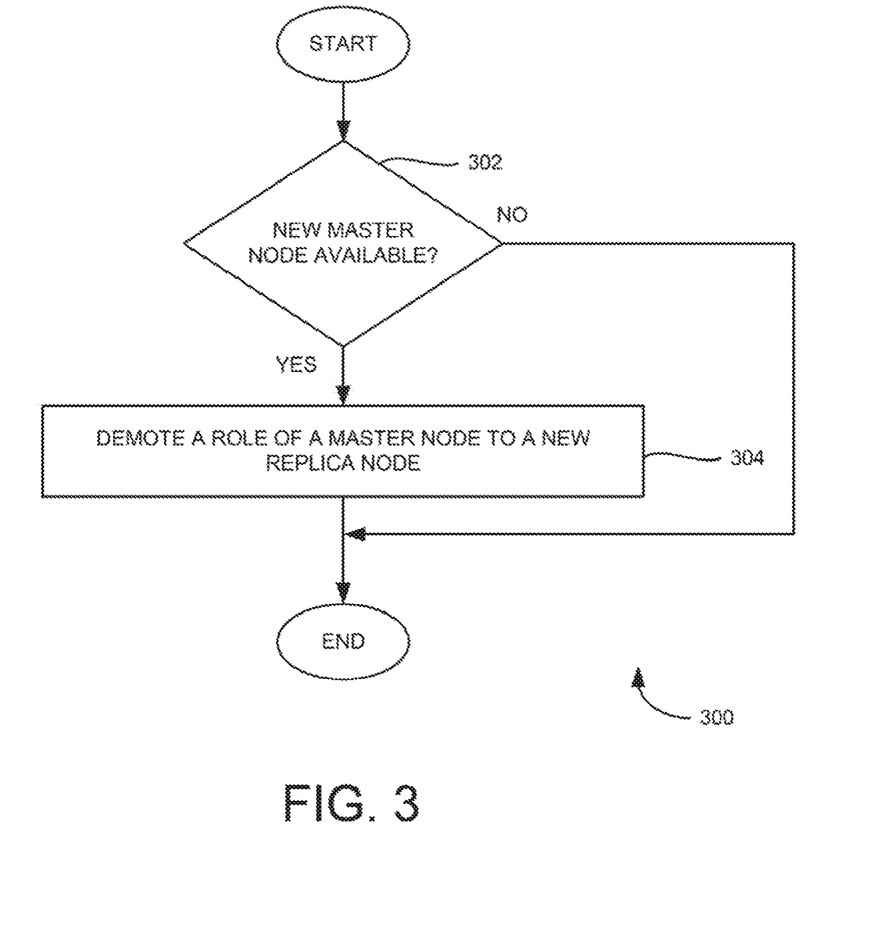
FIG. 3 is an example flow diagram illustrating a role management of a master node in a distributed cluster.

FIG. 3 is example flow diagram 300 illustrating a role management of a master node (e.g., master node 102A of FIG. 1) in a distributed cluster. In one example, steps 302 and 304 may be executed by a second high availability agent running on the master node. At 302, a check may be made to determine whether a new master node is available in the distributed cluster. For example, when the master node is restored after the failure, the second high availability agent running on the master node may determine whether the new master node is available in the distributed cluster. When there is no new master node in the distributed cluster, the master node may continue to operate as the master node. In one example, upon determining the new master node in the distributed cluster, a role of the master node may be demoted to a new replica node by the second high availability agent, at 304. Thus, the described example may be useful in resolving dual role issue to maintain the uniqueness of the role per distributed cluster. For example, a scenario where two compute nodes acting as masters due to network instability may be prevented by maintaining one master per distributed cluster.

The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 4:
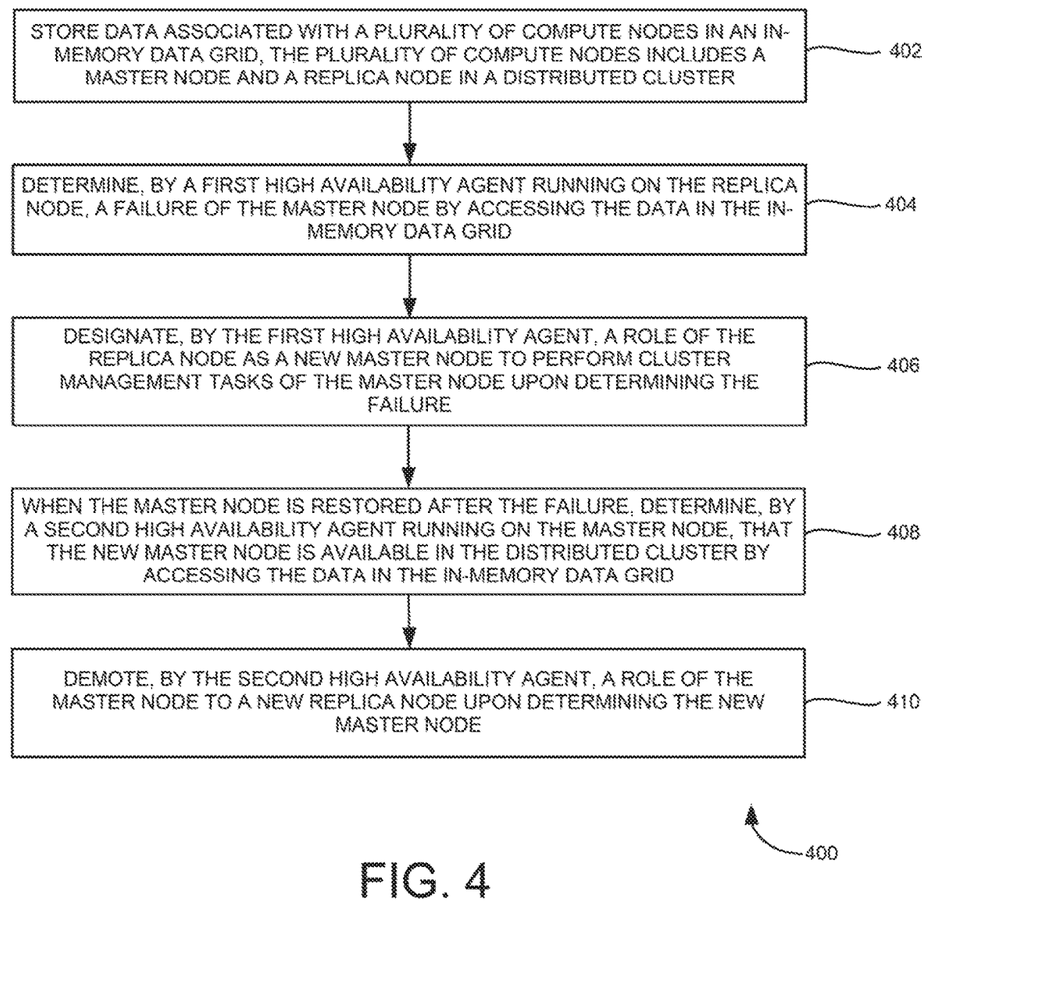
FIG. 4 is an example flow diagram illustrating a role management of compute nodes in a distributed cluster.

FIG. 4 is example flow diagram 400 illustrating a role management of compute nodes in a distributed cluster. It should be understood that the process depicted in FIG. 4 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 402, data associated with a plurality of compute nodes may be stored in an in-memory data grid. The plurality of compute nodes may include a master node and a replica node in a distributed cluster. The in-memory data grid may be formed from memory associated with the plurality of compute nodes. Further, the data written to a shared replication region of the in-memory data grid may be replicated among the plurality of compute nodes in the distributed cluster.

At 404, a first high availability agent running on the replica node may determine a failure of the master node by accessing the data in the in-memory data grid. At 406, the first high availability agent may designate a role of the replica node as a new master node to perform cluster management tasks of the master node upon determining the failure.

At 408, when the master node is restored after the failure, a second high availability agent running on the master node may determine that the new master node is available in the distributed cluster by accessing the data in the in-memory data grid. Further, the second high availability agent may demote a role of the master node to a new replica node upon determining the new master node, at 410. In one example, dual master roles scenario in the distributed cluster may be avoided for seamless operation of the compute nodes.

Figure 5:
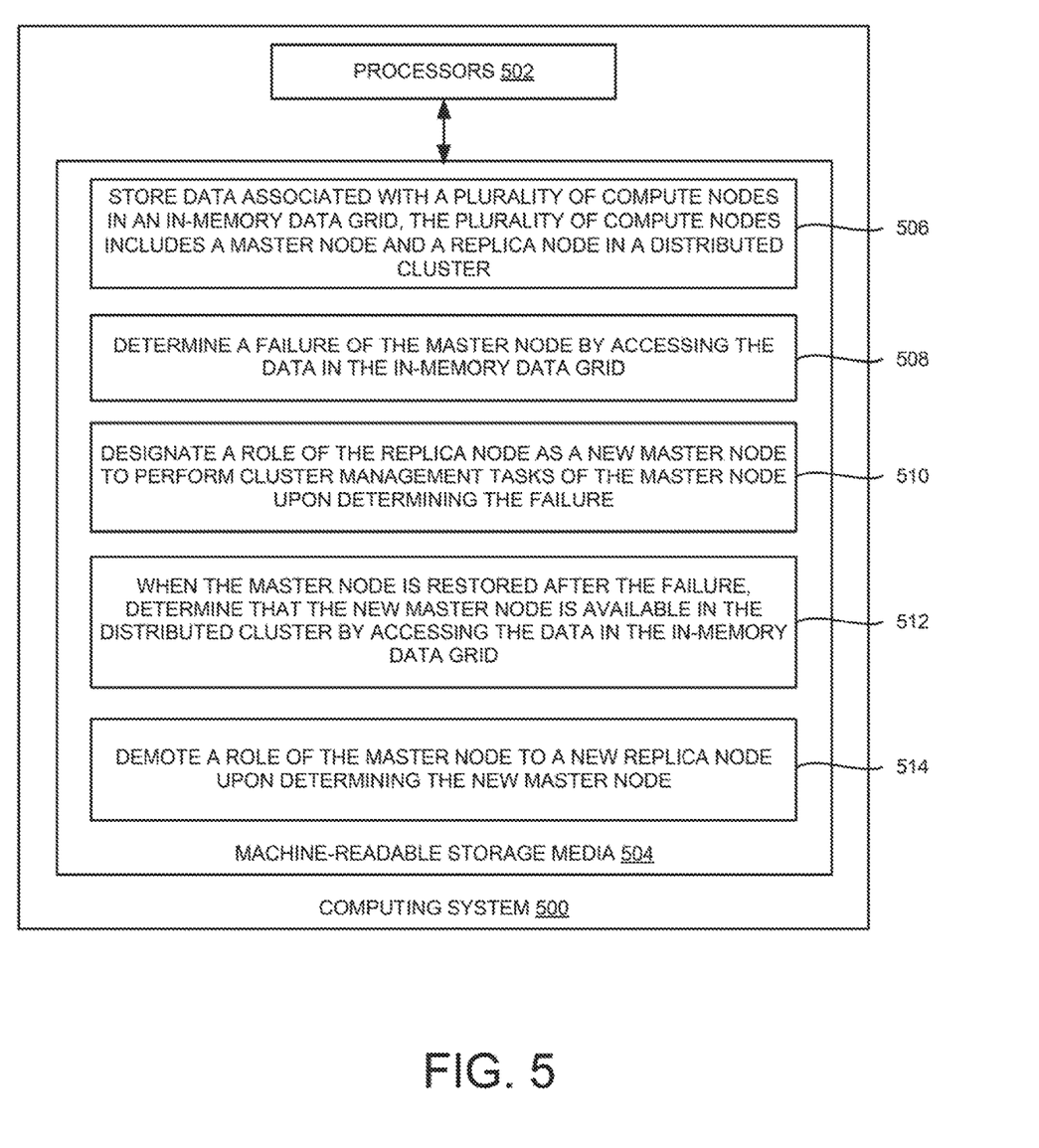
FIG. 5 is a block diagram of an example computing system including non-transitory computer-readable storage media, storing instructions to manage roles of compute nodes in a distributed cluster.

FIG. 5 is a block diagram of example computing system 500 including non-transitory computer-readable storage media, storing instructions to manage roles of compute nodes in a distributed cluster. Computing system 500 may include processors 502 and machine-readable storage media 504 communicatively coupled through a system bus. Processors 502 may be any type of central processing unit (CPU), microprocessor, or processing logic that interprets and executes machine-readable instructions stored in machine-readable storage media 504. Machine-readable storage media 504 may be a random-access memory (RAM) or another type of dynamic storage device that may store information and machine-readable instructions that may be executed by processors 502. For example, machine-readable storage media 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage media 504 may be non-transitory machine-readable media. In an example, machine-readable storage media 504 may be remote but accessible to computing system 500.

Machine-readable storage media 504 may store instructions 506-514. In an example, instructions 506-514 may be executed by processors 502 for managing roles of compute nodes in the distributed cluster. Instructions 506 may be executed by processors 502 to store data associated with a plurality of compute nodes in an in-memory data grid. The plurality of compute nodes may include a master node and a replica node in the distributed cluster. Instructions 508 may be executed by processors 502 to determine a failure of the master node by accessing the data in the in-memory data grid. Instructions 510 may be executed by processors 502 to designate a role of the replica node as a new master node to perform cluster management tasks of the master node upon determining the failure. Instructions 512 may be executed by processors 502 to determine that the new master node is available in the distributed cluster by accessing the data in the in-memory data grid when the master node is restored after the failure. Further, instructions 514 may be executed by processors 502 to demote a role of the master node to a new replica node upon determining the new master node.

Some or all of the system components and/or data structures may also be stored as contents (e.g., as executable or other machine-readable software instructions or structured data) on non-transitory computer-readable media (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable media and/or one or more host computing systems or devices to execute or otherwise use or provide the contents to perform at least some of the described techniques. Some or all of the components and/or data structures may be stored on tangible, non-transitory storage media. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A distributed cluster comprising:
a plurality of compute nodes comprising a master node and a replica node;
an in-memory data grid formed from memory associated with the plurality of compute nodes;
a first high availability agent running on the replica node to:
determine a failure of the master node by accessing data in the in-memory data grid; and
designate a role of the replica node as a new master node to perform cluster management tasks of the master node upon determining the failure; and
a second high availability agent running on the master node to:
determine that the new master node is available in the distributed cluster by accessing the data in the in-memory data grid when the master node is restored after the failure; and
demote a role of the master node to a new replica node upon determining the new master node.

2. The distributed cluster of claim 1, wherein the first high availability agent running on the replica node is to:
initiate a failover operation to failover the replica node to the new master node upon determining the failure of the master node;
upon completion of the failover operation, determine whether the master node is restored by accessing the data in the in-memory data grid;
designate the role of the replica node as the new master node upon determining the master node is not restored; and
broadcast the new master node to the plurality of compute nodes in the distributed cluster.

3. The distributed cluster of claim 2, wherein the first high availability agent running on the replica node is to:
demote the role of the new master node back to the replica node upon determining the master node is restored prior to broadcasting the new master node.

4. The distributed cluster of claim 2, wherein the first high availability agent running on the replica node is to:
determine an unsuccessful broadcasting of the new master node; and
demote the role of the new master node back to the replica node upon determining the unsuccessful broadcasting of the new master node.

5. The distributed cluster of claim 2, wherein the first high availability agent running on the replica node is to:
determine a restoration of the master node during execution of the failover operation by accessing the data in the in-memory data grid; and
terminate the execution of the failover operation upon determining the restoration of the master node.

6. The distributed cluster of claim 1, wherein the data written to a shared replication region of the in-memory data grid is replicated among the plurality of compute nodes in the distributed cluster.

7. A method, comprising:
storing data associated with a plurality of compute nodes in an in-memory data grid, wherein the plurality of compute nodes comprises a master node and a replica node in a distributed cluster;
determining, by a first high availability agent running on the replica node, a failure of the master node by accessing the data in the in-memory data grid;
designating, by the first high availability agent, a role of the replica node as a new master node to perform cluster management tasks of the master node upon determining the failure; and
when the master node is restored after the failure,
determining, by a second high availability agent running on the master node, that the new master node is available in the distributed cluster by accessing the data in the in-memory data grid; and
demoting, by the second high availability agent, a role of the master node to a new replica node upon determining the new master node.

8. The method of claim 7, further comprising:
initiating a failover operation, by the first high availability agent, to failover the replica node to the new master node upon determining the failure of the master node;
upon completion of the failover operation, determining whether the master node is restored by accessing the data in the in-memory data grid;
designating the role of the replica node as the new master node upon determining the master node is not restored; and
broadcasting the new master node to the plurality of compute nodes in the distributed cluster.

9. The method of claim 8, further comprising:
demoting, by the first high availability agent, the role of the new master node back to the replica node upon determining the master node is restored prior to broadcasting the new master node.

10. The method of claim 8, further comprising:
determining, by the first high availability agent, an unsuccessful broadcasting of the new master node; and
demoting the role of the new master node back to the replica node upon determining the unsuccessful broadcasting of the new master node.

11. The method of claim 8, further comprising:
determining, by the first high availability agent, a restoration of the master node during execution of the failover operation by accessing the data in the in-memory data grid; and
terminating the execution of the failover operation upon determining the restoration of the master node.

12. The method of claim 7, wherein the in-memory data grid is formed from memory associated with the plurality of compute nodes.

13. The method of claim 12, wherein the data written to a shared replication region of the in-memory data grid is replicated among the plurality of compute nodes in the distributed cluster.

14. Non-transitory machine-readable storage media encoded with instructions that, when executed by a processor, cause the processor to:
store data associated with a plurality of compute nodes in an in-memory data grid, wherein the plurality of compute nodes comprises a master node and a replica node in a distributed cluster,
determine a failure of the master node by accessing the data in the in-memory data grid;
designate a role of the replica node as a new master node to perform cluster management tasks of the master node upon determining the failure; and
when the master node is restored after the failure,
determine that the new master node is available in the distributed cluster by accessing the data in the in-memory data grid; and
demote a role of the master node to a new replica node upon determining the new master node.

15. The non-transitory machine-readable storage media of claim 14, further comprising instructions that, when executed by the processor, cause the processor to:
initiate a failover operation to failover the replica node to the new master node upon determining the failure of the master node;
upon completion of the failover operation, determine whether the master node is restored by accessing the data in the in-memory data grid;
designate the role of the replica node as the new master node upon determining the master node is not restored; and
broadcast the new master node to the plurality of compute nodes in the distributed cluster.

16. The non-transitory machine-readable storage media of claim 15, further comprising instructions that, when executed by the processor, cause the processor to:
demote the role of the new master node back to the replica node upon determining the master node is restored prior to broadcasting the new master node.

17. The non-transitory machine-readable storage media of claim 15, further comprising instructions that, when executed by the processor, cause the processor to:
determine an unsuccessful broadcasting of the new master node; and
demote the role of the new master node back to the replica node upon determining the unsuccessful broadcasting of the new master node.

18. The non-transitory machine-readable storage media of claim 15, further comprising instructions that, when executed by the processor, cause the processor to:
determine a restoration of the master node during execution of the failover operation by accessing the data in the in-memory data grid; and
terminate the execution of the failover operation upon determining the restoration of the master node.

19. The non-transitory machine-readable storage media of claim 14, wherein the in-memory data grid is formed from memory associated with the plurality of compute nodes.

20. The non-transitory machine-readable storage media of claim 19, wherein the data written to a shared replication region of the in-memory data grid is replicated among the plurality of compute nodes in the distributed cluster.

\* \* \* \* \*